Oct. 27, 1931.    H. J. HEIDER    1,829,092
VEHICLE TONGUE COUPLING
Filed Dec. 8, 1930
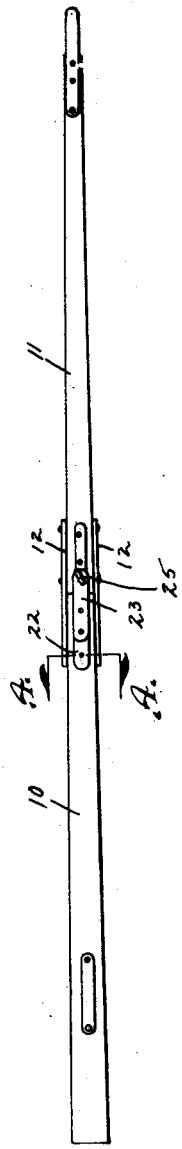
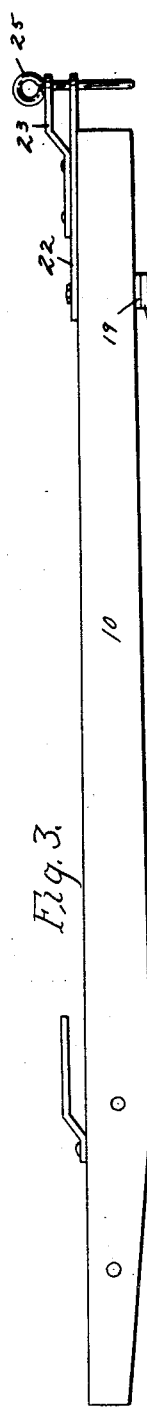
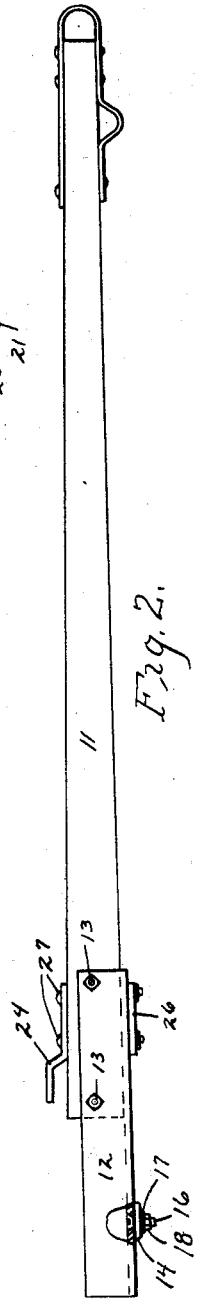
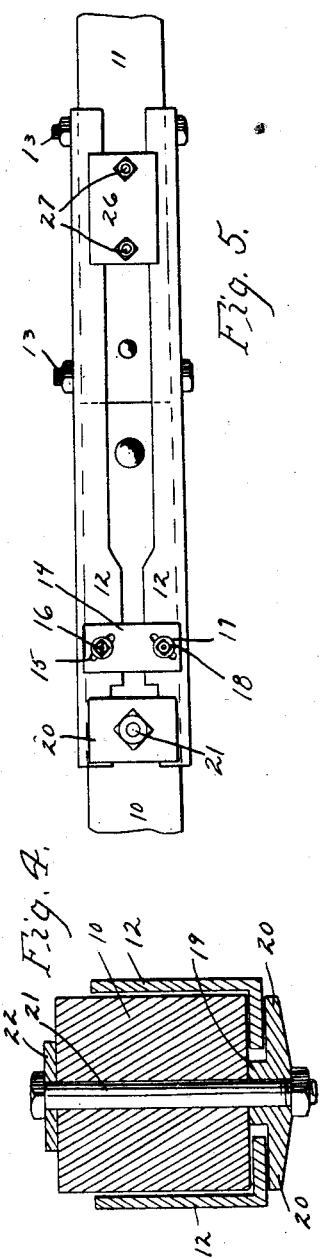
Inventor
Henry J. Heider
by Craig & Hague  Attys Patented Oct. 27, 1931

1,829,092

UNITED STATES PATENT OFFICE

HENRY J. HEIDER, OF CARROLL, IOWA

VEHICLE TONGUE COUPLING

Application filed December 8, 1930. Serial No. 500,847.

When vehicles such as wagons are drawn by draft animals, it is desirable to have a tongue of considerable length, and when the same vehicle is drawn by a tractor, it is desirable to have a much shorter tongue, and since the tractor has come into general use and the same vehicle is at times drawn by draft animals and at other times by tractors, considerable difficulty, annoyance and expense is incurred in substituting one tongue for another on the vehicle, or in coupling together the forward and rear portions of a two part tongue.

The object of this invention is to provide a coupling device of simple, durable and inexpensive construction, which may be readily, quickly and easily applied by unskilled operators to the forward and rear portions of the vehicle tongue, and when thus applied, the forward portion may be readily and easily attached to or detached from the rear tongue portion by simply manipulating a coupling pin, and when in use as a full length tongue, the portion of the tongue at which the coupling is made will be strongly braced against strains in all directions.

A further object is to provide a device of this class which may be readily, easily and accurately fitted to wagon tongues of various widths and thicknesses and tapered at various angles, so that my improved coupling may be accurately fitted to vehicle tongues of all ordinary sizes and shapes.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a vehicle tongue having my improved coupling applied thereto.

Figure 2 shows a similar view of the front portion of the vehicle tongue with my improved coupling device applied thereto.

Figure 3 shows a side elevation of the rear portion of the tongue with the coupling pin in position in the coupling bar.

Figure 4 shows an enlarged detail sectional view on the line 4—4 of Figure 1.

Figure 5 shows a bottom plan view of the adjacent end portions of the tongue with my improved coupling device applied thereto.

Referring to the accompanying drawings, I have used the reference numeral 10 to indicate the rear tongue member and 11 the forward tongue member. Together they form a tongue of the proper length for use with draft animals, and the rear member alone is of the proper length for coupling to a tractor.

The tongues now in general use are usually tapered toward the front and are of various thicknesses and widths and are of varying degrees of taper.

For connecting the tongue members together, I have provided two angle bars 12 having upright sides and inwardly extended bottom portions. These angle bars are connected by bolts 13 to the front tongue member 11, and are extended transversely through the tongue member. These bars extend a considerable distance in the rear of the tongue member. The adjacent edges of the bottom members of the angle bars 12 stand spaced apart from each other on tongues of ordinary widths, so that if an extremely narrow tongue should be employed, these angle bars 12 would not interfere with each other.

For the purpose of preventing the rear ends of the angle bars 12 from spreading when in use, I have provided a flat metal plate 14 having slots 15 run at divergent angles, and I have provided bolts 16 which extend through the bottom of the angle bars 12 and through the slots 15, and are provided on their lower ends with washers 17 and nuts 18.

In applying the plate 14, the angle bars are first secured to the front portion of the tongue, as shown, and then the bolts 16 are placed in position and the nuts and washers applied, and during this operation, the plate 14 may be moved forwardly or rearwardly so that the slots 15 will be in position to properly receive the bolts, and after the nuts have been tightened, the two sides of the angle bars are firmly and securely held in position against lateral movement.

For supporting the forward end of the rear tongue member against pivotal up and down movements relative to the forward tongue member, I provide in the rear tongue member at a point spaced apart from its front end a supporting plate having a central member 19 to be fitted against the lower surface of the tongue, and two outwardly extending supports 20 spaced apart from the under surface of the tongue far enough to freely receive the bottom members of the angle bars 12. This plate is held in position by a bolt 21 extended through the rear portion of the tongue.

This bolt 21 also extends through one of the coupling bars 22 at the top of the rear tongue member, and connected with the coupling bar 22 is a coacting coupling bar 23. The forward ends of the coupling bars are extended in advance of the rear tongue member and above it, and they are spaced apart to receive the coupling bar 24 secured to the forward tongue member. The coupling pin is indicated by the numeral 25.

At the forward end of the angle bars 12 is a plate 26 engaging the under surfaces of the angle bars and firmly held in place by the bolts 27, which extend through the plate 26 and through the forward tongue member and through the coupling bar 24.

In practical use my improved coupling device is originally applied to a tongue as follows:

First the tongue is cut into two members of the desired length. Then the angle bars are fixed to the forward member as described, and this obviously may be done on wagon tongues of various widths and varying degrees of taper, without any alteration either in the shape of the tongue or in the shape of the coupling device.

After the coupling device is fitted into position, and when it is desired to remove the forward tongue member, the operator need only remove the coupling pin 25 and draw the forward member straight forwardly, and this can be done easily and without the danger of having the rear tongue member bind either the angle bars 12, because of the taper of the tongue, and because the rear ends of the angle bars are properly spaced apart to prevent binding the tongue when the plate 14 is properly bolted to the rear end portions of the angle bars.

When in use, the extensions 20 of the supporting plate prevent up and down movements of the rear end of the tongue relative to the forward end, and make the completed full length tongue just as strong and durable as before it was cut in two.

I claim as my invention:

1. A coupling device for vehicle tongues comprising two angle bars designed to be fitted against the sides and bottom of a forward tongue member and to be projected over a portion of the rear tongue member, and a supporting device designed to be fixed to a rear tongue member and shaped to engage the under surface of the angle bars to limit the up and down movement of the tongue members relative to each other.

2. A coupling device for vehicle tongues comprising two angle bars designed to be fitted against the sides and bottom of a forward tongue member and to be projected over a portion of the rear tongue member, a supporting device designed to be fixed to a rear tongue member and shaped to engage the under surface of the angle bars to limit the up and down movement of the tongue members relative to each other, a slotted plate, and bolts extended through the slots and through the under members of the angle bars.

3. A coupling device for vehicle tongues comprising two angle bars designed to be fitted against the sides and bottom of a forward tongue member and to be projected over a portion of the rear tongue member, a supporting device designed to be fixed to a rear tongue member and shaped to engage the under surface of the angle bars to limit the up and down movement of the tongue members relative to each other, a slotted plate, and bolts extended through the slots and through the under members of the angle bars, said slots being at divergent angles.

4. A coupling device for vehicle tongues comprising two angle bars designed to be fitted against the sides and bottom of a forward tongue member and to be projected over a portion of the rear tongue member, a supporting device designed to be fixed to a rear tongue member and shaped to engage the under surface of the angle bars to limit the up and down movement of the tongue members relative to each other, coacting coupling bars designed to be fitted to the front and rear tongue members, and a coupling pin.

5. In a device of the class described, the combination of a front tongue member, a rear tongue member, two angle bars fitted to the front tongue member, one being parallel with one side of the tongue and the other being parallel with the other side, and each having its under flange engaging the under surface of the tongue, means for permanently securing the angle bars to the front tongue member, and a supporting plate fixed to the rear tongue member between the angle bars and having outwardly extended flanges to loosely engage the under surfaces of the flanges.

Des Moines, Iowa, December 1, 1930.

HENRY J. HEIDER.